United States Patent
Wu

(10) Patent No.: US 10,291,430 B2
(45) Date of Patent: May 14, 2019

(54) METHOD, DEVICE AND SYSTEM FOR MANAGING TRILL NETWORK USING THREE-LAYER NETWORK MANAGER

(71) Applicant: ZTE CORPORATION, Shenzhen, Guangdong Province (CN)

(72) Inventor: Qiang Wu, Shenzhen (CN)

(73) Assignee: ZTE Corporation, Shenzhen, Guangdong Province (CN)

(*) Notice: Subject to any disclaimer, the term of this patent is extended or adjusted under 35 U.S.C. 154(b) by 165 days.

(21) Appl. No.: 15/323,089

(22) PCT Filed: Oct. 21, 2014

(86) PCT No.: PCT/CN2014/089075
§ 371 (c)(1),
(2) Date: Mar. 3, 2017

(87) PCT Pub. No.: WO2015/154421
PCT Pub. Date: Oct. 15, 2015

(65) Prior Publication Data
US 2017/0237581 A1 Aug. 17, 2017

(30) Foreign Application Priority Data
Jul. 1, 2014 (CN) .......................... 2014 1 0310539

(51) Int. Cl.
*H04L 12/46* (2006.01)
*H04L 12/751* (2013.01)
*H04L 12/721* (2013.01)

(52) U.S. Cl.
CPC ........ *H04L 12/462* (2013.01); *H04L 12/4633* (2013.01); *H04L 12/4641* (2013.01); *H04L 45/02* (2013.01); *H04L 45/66* (2013.01)

(58) Field of Classification Search
CPC ... H04L 12/462; H04L 45/02; H04L 12/4641; H04L 12/4633
See application file for complete search history.

(56) References Cited

U.S. PATENT DOCUMENTS 7,787,480 B1 * 8/2010 Mehta ................... H04L 12/465
370/401
8,830,875 B1 * 9/2014 Bulusu .................... H04L 45/48
370/256
(Continued)

FOREIGN PATENT DOCUMENTS

CN 101827009 A 9/2010
CN 102857429 A 1/2013
(Continued)

OTHER PUBLICATIONS

Minimizing ARP Broadcasting in TRILL, Nuutti Varis, Jukka Manner, Department of Communications and Networking, Helsinki University of Technology, Finland. 2009. XP031585798.

*Primary Examiner* — Mohammad S Anwar
(74) *Attorney, Agent, or Firm* — Ling Wu; Stephen Yang; Ling and Yang Intellectual Property

(57) ABSTRACT

The present document discloses a method, apparatus and system for managing a TRILL network by a layer-3 network manager. Herein, the method includes: associating a target RB in the TRILL network with an interface of a layer-3 VLAN, publishing the layer-3 VLAN as a participant VLAN of the target RB, and calculating and issuing a broadcast decapsulation flag for the layer-3 VLAN, then an ingress RB encapsulating a layer-2 Ethernet frame which is sent by the layer-3 network manager to the target RB and includes a layer-3 IP message into a TRILL data message for sending to the target RB, and the target RB decapsulating the TRILL to obtain the original layer-2 Ethernet frame for processing. By the present document, the problem of incapability in (Continued)

managing an RB running TRILL by the layer-3 network manager in the related technology is solved, and the TRILL network is conveniently planned and configured.

18 Claims, 3 Drawing Sheets

(56) References Cited

U.S. PATENT DOCUMENTS

2012/0281700 A1  11/2012  Koganti et al.
2014/0056178 A1   2/2014  Tsai et al.

FOREIGN PATENT DOCUMENTS

CN      103166858 A    6/2013
WO      2014079369 A1  5/2014

* cited by examiner

Broadcast table

METHOD, DEVICE AND SYSTEM FOR MANAGING TRILL NETWORK USING THREE-LAYER NETWORK MANAGER

TECHNICAL FIELD

The present document relates to the field of communication, and more particularly to a method, apparatus and system for managing a Transparent Interconnection of Lots of Links (TRILL) network by a layer-3 network manager.

BACKGROUND OF THE RELATED ART

At present, a TRILL protocol is already an international standard protocol. Along with gradual evolution for many years, a layer-3 routing technology is applied to layer-2 transmission to implement a large-scale layer-2 cloud to meet an increasing requirement of a convergent network or a super-large data center, and construct a good and efficient layer-2 broadcast domain. TRILL implements path calculation by adopting a TRILL-Intermediate System to Intermediate System (ISIS) protocol as its dynamic protocol.

TRILL-ISIS is a dynamic link-state-based Interior Gateway Protocol (IGP). According to a TRILL-ISIS protocol, after neighbors are established by hello message interactive negotiation, each Routing Bridge (RB) generates a Link State Protocol Data Unit (LSP) to describe link state information of the RB, sends it to a network, and may also store LSPs sent by all RB equipment on a network topology to form a Link State DataBase (LSDB). TRILL-ISIS calculates an optimal route for reaching a destination address through a Shortest Path First (SPF) algorithm by virtue of the Link State DataBase.

An equipment RB running TRILL may usually include a pure layer-2 Ethernet interface only, and may only process and report an Ethernet message. Then, in a communication mechanism, an RB may not be managed by virtue of layer-3 network management equipment, and it is impossible to conveniently plan and configure a TRILL network.

For the problem of incapability in managing an RB running TRILL by virtue of a layer-3 network manager in the related technology, there is yet no effective solution disclosed at present.

SUMMARY

Embodiments provide a method, apparatus and system for managing a TRILL network by a layer-3 network manager, so as to at least solve the problem of incapability in managing an RB running TRILL by virtue of the layer-3 network manager in the related technology.

According to an embodiment of the present document, a method for managing a TRILL network by a layer-3 network manager is provided, which includes: associating a target Routing Bridge, RB, in the TRILL network with an interface of a layer-3 Virtual Local Area Network, VLAN; publishing, by the target RB, the layer-3 VLAN as a participant VLAN of the target RB, and calculating and issuing a broadcast decapsulation flag for the layer-3 VLAN, herein the participant VLAN is used for all RBs in the TRILL network according to the participant VLAN calculating and generating a unicast encapsulation table, a broadcast encapsulation table and a broadcast forwarding table for reaching the target RB; receiving, by an ingress RB in the TRILL network, an Ethernet frame which is sent by the layer-3 network manager and carries the layer-3 VLAN and Media Access Control, MAC, information of the interface of the layer-3 VLAN; encapsulating, by the ingress RB, the Ethernet frame into a first TRILL data message according to the unicast encapsulation table or the broadcast encapsulation table, and forwarding the first TRILL data message to the target RB according to an acquired unicast forwarding table or the broadcast forwarding table; receiving, by the target RB, the first TRILL data message forwarded according to the broadcast forwarding table, and decapsulating the first TRILL data message to obtain the Ethernet frame according to the broadcast decapsulation flag; or, receiving, by the RB, the first TRILL data message forwarded according to the unicast forwarding table, and decapsulating the first TRILL message to obtain the Ethernet frame.

The receiving, by the target RB, the first TRILL data message forwarded according to the broadcast forwarding table according to the broadcast decapsulation flag, and decapsulating the first TRILL data message to obtain the Ethernet frame includes: determining, by the target RB, that the received first TRILL data message is a broadcast data message and the first TRILL data message is received from a VLAN having the broadcast decapsulation flag of the target RB, and then decapsulating the first TRILL data message to obtain the Ethernet frame.

After decapsulating, by the target RB, the first TRILL data message to obtain the Ethernet frame, the method further includes: judging, by the target RB, whether a destination Internet Protocol IP address contained in the Ethernet frame is an IP address of the interface of the layer-3 VLAN or not according to a layer-3 forwarding table of the target RB; and if the destination IP address contained in the Ethernet frame is the IP address of the interface of the layer-3 VLAN, sending, by the target RB, the Ethernet frame to the interface of the layer-3 VLAN and processing the Ethernet frame.

After receiving, by the target RB, the first TRILL data message forwarded according to the broadcast forwarding table according to the broadcast decapsulation flag, and decapsulating the first TRILL data message to obtain the Ethernet frame, the method further includes: acquiring, by the target RB, VLAN and MAC information of the layer-3 network manager carried in the first TRILL data message, and adding the VLAN and MAC information of the layer-3 network manager into a TRILL MAC table of the target RB.

After decapsulating, by the target RB, the first TRILL data message to obtain the Ethernet frame, the method further includes: encapsulating, by the target RB, a response message of the Ethernet frame into a second TRILL data message, herein source MAC information carried in the second TRILL data message is VLAN and MAC information of the interface of the layer-3 VLAN, and sending the second TRILL data message to the layer-3 network manager through the ingress RB.

The forwarding, by the ingress RB in the TRILL network, the first TRILL data message to the target RB according to the acquired unicast forwarding table includes: acquiring, by the ingress RB, the second TRILL data message from the target RB, herein the second TRILL data message carries the VLAN and MAC information of the interface of the layer-3 VLAN, and adding the VLAN and the MAC information into a TRILL MAC table of the ingress RB; and acquiring, by the ingress RB, the MAC information of the interface of the layer-3 VLAN in the received Ethernet frame, and forwarding through the unicast forwarding table the first TRILL data message to the target RB according to the MAC information of the interface of the layer-3 VLAN in the Ethernet frame. publishing, by the target RB, the layer-3 VLAN as the participant VLAN of the target RB includes: including, by the target RB, an Interested VLANs and Spanning Tree Roots Sub-Threshold Limit Value, TLV, in a router capability TLV of a generated LSP message.

After associating the target RB in the TRILL network with the interface of the layer-3 VLAN, the method further includes: not performing an enabled interface operation of the TRILL network on the interface of the layer-3 VLAN.

According to another embodiment of the present document, an apparatus for managing a TRILL network by a layer-3 network manager is provided, which is located in a target Routing Bridge (RB) in the TRILL network, and includes: an association module, arranged to associate with an interface of a layer-3 Virtual Local Area Network, VLAN; publish the layer-3 VLAN as a participant VLAN of the target RB, and calculate and issue a broadcast decapsulation flag for the layer-3 VLAN, herein the participant VLAN is used for all RBs in the TRILL network according to the participant VLAN calculating and generating a unicast encapsulation table, a broadcast encapsulation table and a broadcast forwarding table for reaching the target RB; and a decapsulation module, arranged to receive a first TRILL data message forwarded by an ingress RB in the TRILL network according to the broadcast forwarding table and decapsulate the first TRILL data message to obtain an Ethernet frame according to the broadcast decapsulation flag; or, receive the first TRILL data message forwarded by the ingress RB in the TRILL network according to a unicast forwarding table and decapsulate the first TRILL message to obtain the Ethernet frame; herein, the ingress RB receives the Ethernet frame which is sent by the layer-3 network manager and carries the layer-3 VLAN and Media Access Control, MAC, information of the interface of the layer-3 VLAN, and the ingress RB encapsulates the Ethernet frame into the first TRILL data message according to the unicast encapsulation table or the broadcast encapsulation table, and forwards the first TRILL data message to the target RB according to the acquired unicast forwarding table or the broadcast forwarding table.

The decapsulation module includes: a determination unit, arranged to determine that the received first TRILL data message is a broadcast data message and the first TRILL data message is received from a VLAN having the broadcast decapsulation flag of the target RB, and then decapsulate the first TRILL data message to obtain the Ethernet frame.

The apparatus further includes: a judgment module, arranged to judge whether a destination IP address contained in the Ethernet frame is an IP address of the layer-3 interface or not according to a layer-3 forwarding table of the target RB; and a processing module, arranged to, in a condition that a judgment result is yes, send the Ethernet frame to the interface of the layer-3 VLAN and process the Ethernet frame.

The apparatus further includes: an addition module, arranged to acquire VLAN and MAC information of the layer-3 network manager carried in the first TRILL data message, and add the VLAN and MAC information of the layer-3 network manager into a TRILL MAC table of the target RB.

The apparatus further includes: an encapsulation module, arranged to encapsulate a response message of the Ethernet frame into a second TRILL data message, herein source MAC information carried in the second TRILL data message is VLAN and MAC information of the interface of the layer-3 VLAN, and send the second TRILL data message to the layer-3 network manager through the ingress RB.

According to another embodiment of the present document, a system for managing a TRILL network by a layer-3 network manager is further provided, which includes: the layer-3 network manager, arranged to send an Ethernet frame carrying a layer-3 Virtual Local Area Network, VLAN, and MAC information of an interface of the layer-3 VLAN; a target Routing Bridge, RB, in the TRILL network, arranged to associate with the interface of the layer-3 VLAN; publish the layer-3 VLAN as a participant VLAN of the target RB, and calculate and issue a broadcast decapsulation flag for the layer-3 VLAN, herein the participant VLAN is used for all RBs in the TRILL network according to the participant VLAN calculating and generating a unicast encapsulation table, a broadcast encapsulation table and a broadcast forwarding table for reaching the target RB; an ingress RB in the TRILL network, arranged to receive an Ethernet frame which is sent by the layer-3 network manager and carries the layer-3 VLAN and MAC information of the interface of the layer-3 VLAN, encapsulate the Ethernet frame into a first TRILL data message according to the unicast encapsulation table or the broadcast encapsulation table, and forward the first TRILL data message to the target RB according to an acquired unicast forwarding table or the broadcast forwarding table; the target RB is further arranged to receive the first TRILL data message forwarded according to the broadcast forwarding table, and decapsulate the first TRILL data message to obtain the Ethernet frame according to the broadcast decapsulation flag; or, receive the first TRILL data message forwarded according to the unicast forwarding table, and decapsulate the first TRILL message to obtain the Ethernet frame.

According to the embodiments of the present document, the following manner is adopted: the target RB in the TRILL network is associated with the interface of the layer-3 VLAN; the target RB publishes the layer-3 VLAN as the participant VLAN of the target RB, and calculates and issues the broadcast decapsulation flag for the layer-3 VLAN, herein, the participant VLAN is used for all the RBs in the TRILL network according to the participant VLAN calculating and generating the unicast encapsulation table, the broadcast encapsulation table and the broadcast forwarding table for reaching the target RB; the ingress RB in the TRILL network receives the Ethernet frame which is sent by the layer-3 network manager and carries the layer-3 VLAN and the MAC information of its interface; the ingress RB encapsulates the Ethernet frame into the first TRILL data message according to the unicast encapsulation table or the broadcast encapsulation table, and forwards the first TRILL data message to the target RB according to the acquired unicast forwarding table or the broadcast forwarding table; the target RB receives the first TRILL data message forwarded according to the broadcast forwarding table, and decapsulates the first TRILL data message to obtain the Ethernet frame according to the broadcast encapsulation flag; or, the RB receives the first TRILL data message forwarded according to the unicast forwarding table, and decapsulates the first TRILL message to obtain the Ethernet frame. The problem of incapability in managing an RB running TRILL by virtue of the layer-3 network manager in the related technology is solved, and the TRILL network is conveniently planned and configured.

BRIEF DESCRIPTION OF DRAWINGS

The drawings described here are adopted to provide a further understanding to the embodiment of the present document, and form a part of the present application. Schematic embodiments of the present document and descriptions thereof are adopted to explain the present document and not intended to form improper limits to the present document. In the drawings.

DETAILED DESCRIPTION

The present document will be described below with reference to the drawings and combined with embodiments in detail. It is important to note that the embodiments in the present application and characteristics in the embodiments may be freely combined under the condition of no conflicts.

Figure 1:
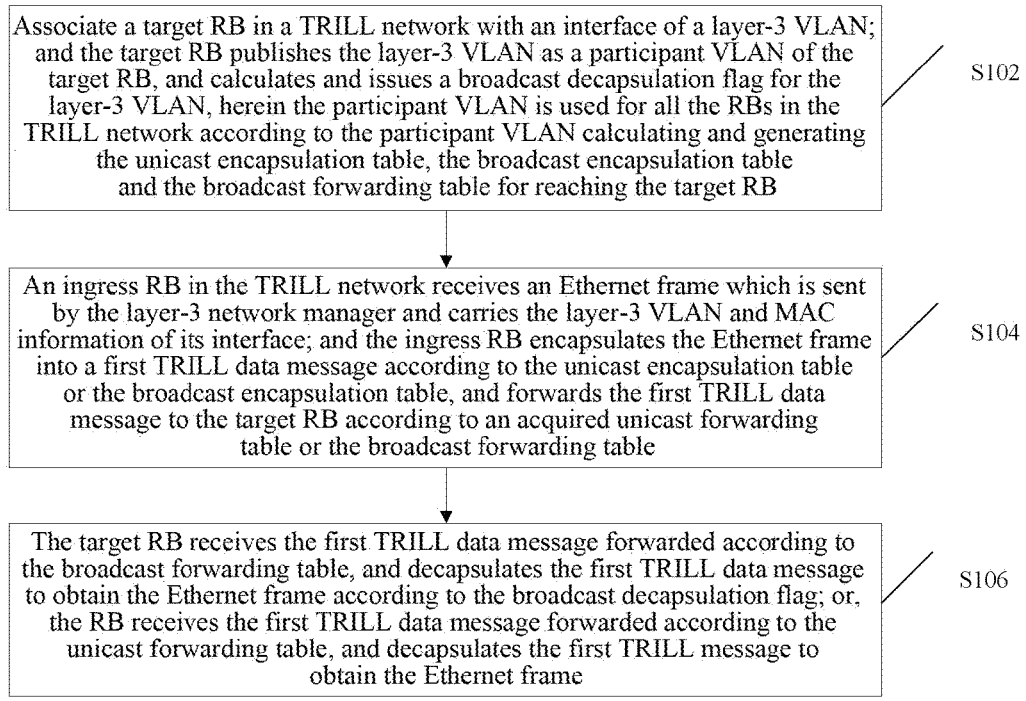
FIG. 1 is a flowchart of a method for managing a TRILL network by a layer-3 network manager according to an embodiment of the present document.

According to an embodiment of the embodiments of the present document, a method for managing a TRILL network by a layer-3 network manager is provided. FIG. 1 is a flowchart of a method for managing a TRILL network by a layer-3 network manager according to an embodiment of the present document, and as shown in FIG. 1, the method includes the following steps.

In step S102: a target RB in the TRILL network is associated with an interface of a layer-3 Virtual Local Area Network (VLAN); and the target RB publishes the layer-3 VLAN as a participant VLAN of the target RB, and calculates and issues a broadcast decapsulation flag for the layer-3 VLAN, herein, the participant VLAN is used for all RBs in the TRILL network according to the participant VLAN to calculate and generate a unicast encapsulation table, a broadcast encapsulation table and a broadcast forwarding table for reaching the target RB.

In step S104: an ingress RB in the TRILL network receives an Ethernet frame which is sent by the layer-3 network manager and carries the layer-3 VLAN and MAC information of its interface; and the ingress RB encapsulates the Ethernet frame into a first TRILL data message according to the unicast encapsulation table or the broadcast encapsulation table, and forwards the first TRILL data message to the target RB according to an acquired unicast forwarding table or the broadcast forwarding table.

In step S106: the target RB receives the first TRILL data message forwarded according to the broadcast forwarding table, and decapsulates the first TRILL data message to obtain the Ethernet frame according to the broadcast decapsulation flag; or, the RB receives the first TRILL data message forwarded according to the unicast forwarding table, and decapsulates the first TRILL message to obtain the Ethernet frame.

In the embodiment, by the abovementioned steps, the target RB in the TRILL network is associated the interface of the layer-3 VLAN at first, publishes the layer-3 VLAN as the participant VLAN of the target RB, and calculates and issues the broadcast decapsulation flag for the layer-3 VLAN, then the ingress RB encapsulates a layer-2 Ethernet frame which is sent to the target RB by the layer-3 network manager and includes a layer-3 IP message into a TRILL data message for sending to the target RB, and the target RB decapsulates the TRILL to obtain and process the original layer-2 Ethernet frame including the layer-3 IP message. Communication of the layer-3 network manager with the target RB in the TRILL network in a layer-3 manner is implemented, the problem of incapability in managing the RB running TRILL by virtue of the layer-3 network manager in the related technology is solved, and the TRILL network is conveniently planned and configured.

Herein, the broadcast encapsulation table is configured to encapsulate a layer-2 Ethernet frame into a TRILL broadcast data message; the unicast encapsulation table is arranged to encapsulate a layer-2 Ethernet frame into a TRILL unicast data message; the broadcast forwarding table is configured to forward a TRILL broadcast data message; the unicast forwarding table is arranged to forward a TRILL unicast data message; and a TRILL MAC table is configured to judge whether TRILL unicast may be performed and perform the unicast to which nickname of the RB, and may learn any TRILL data message when receiving it.

The target RB may receive the abovementioned Ethernet frame through a broadcast data message as follows: the target RB determines that the first TRILL data message which is received is a broadcast data message and the first TRILL data message is received from a VLAN having the broadcast decapsulation flag of the target RB, and then decapsulates the first TRILL data message to obtain the Ethernet frame.

After the target RB decapsulates the first TRILL data message to obtain the Ethernet frame, the target RB may judge whether a destination IP address included in the Ethernet frame is an IP address of the interface of the layer-3 VLAN or not according to a layer-3 forwarding table of the target RB its own; and if YES, the target RB sends the Ethernet frame to the interface of the layer-3 VLAN and processes the Ethernet frame.

After the target RB receives the first TRILL data message forwarded according to the broadcast forwarding table according to the broadcast decapsulation flag, and decapsulates the first TRILL data message to obtain the Ethernet frame, the target RB may acquire VLAN and MAC information of the layer-3 network manager carried in the first TRILL data message, and add the VLAN and MAC information of the layer-3 network manager into a TRILL MAC table of the target RB.

The target RB may give a response to the Ethernet frame in a manner as follows: the target RB encapsulates a response message of the Ethernet frame into a second TRILL data message, herein source MAC information carried in the second TRILL data message is the VLAN and MAC information of the interface of the layer-3 VLAN, and sends the second TRILL data message to the layer-3 network manager through the ingress RB.

The target RB may receive the abovementioned Ethernet frame through a unicast data message as follows: the ingress RB acquires the second TRILL data message from the target RB, herein, the second TRILL data message carries the VLAN and MAC information of the interface of the layer-3 VLAN, and adds the VLAN and the MAC information into a TRILL MAC table of the ingress RB; and the ingress RB acquires the MAC information of the interface of the layer-3 VLAN in the received Ethernet frame, and forwards through the unicast forwarding table the first TRILL data message to the target RB according to the MAC information of the interface of the layer-3 VLAN in the Ethernet frame.

The target RB may include an Interested VLANs and Spanning Tree Roots Sub-TLV in a router capability TLV of a generated LSP message to publish the VLAN as the participant VLAN of the target RB.

In addition, after associating the target RB with the interface of the layer-3 VLAN, some conventional enabled interface operations of the TRILL network are not performed on the interface of the layer-3 VLAN.

Figure 2:
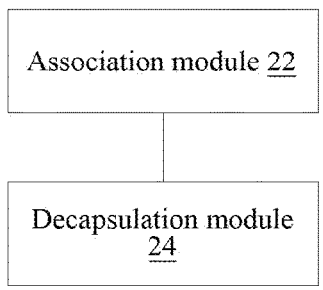
FIG. 2 is a structural diagram of an apparatus for managing a TRILL network by a layer-3 network manager according to an embodiment of the present document.

Corresponding to the abovementioned method, the embodiment further provides an apparatus for managing a TRILL network by a layer-3 network manager. FIG. 2 is a structure block diagram of an apparatus for managing a TRILL network by a layer-3 network manager according to an embodiment of the present document, and as shown in FIG. 2, the apparatus includes an association module 22 and a decapsulation module 24. Each module will be described below in detail.

The association module 22 is arranged to associate with an interface of a layer-3 Virtual Local Area Network (VLAN), publish the layer-3 VLAN as a participant VLAN of the target RB, and calculate and issue a broadcast decapsulation flag for the layer-3 VLAN, herein, the participant VLAN is used for all RBs in the TRILL network according to the participant VLAN to calculate and generate a unicast encapsulation table, a broadcast encapsulation table and a broadcast forwarding table for reaching the target RB; and the decapsulation module 24 is connected with the association module 22, and is arranged to receive a first TRILL data message forwarded by an ingress RB in the TRILL network according to the broadcast forwarding table and decapsulate the first TRILL data message to obtain an Ethernet frame according to the broadcast decapsulation flag, or, receive the first TRILL data message forwarded by the ingress RB in the TRILL network according to a unicast forwarding table and decapsulate the first TRILL message to obtain the Ethernet frame, herein, the ingress RB receives the Ethernet frame which is sent by the layer-3 network manager and carries the layer-3 VLAN and MAC information of its interface; and the ingress RB encapsulates the Ethernet frame into the first TRILL data message according to the unicast encapsulation table or the broadcast encapsulation table, and forwards the first TRILL data message to the target RB according to the acquired unicast forwarding table or the broadcast forwarding table.

The decapsulation module 24 may include: a determination unit, arranged to determine that the first TRILL data message which is received is a broadcast data message and the first TRILL data message is received from a VLAN having the broadcast decapsulation flag of the target RB, and then decapsulate the first TRILL data message to obtain the Ethernet frame.

The apparatus may further include: a judgment module, connected with the decapsulation module 24 and arranged to judge whether a destination IP address included in the Ethernet frame is an IP address of the layer-3 interface or not according to a layer-3 forwarding table of the target RB its own; and a processing module, arranged to, in a condition that a judgment result is yes, send the Ethernet frame to the interface of the layer-3 VLAN and process the Ethernet frame.

The apparatus may further include: an addition module, connected with the decapsulation module 24 and arranged to acquire VLAN and MAC information of the layer-3 network manager carried in the first TRILL data message, and add the VLAN and MAC information of the layer-3 network manager into a TRILL MAC table of the target RB.

The apparatus may further include: an encapsulation module, arranged to encapsulate a response message of the Ethernet frame into a second TRILL data message, herein, source MAC information carried in the second TRILL data message is the VLAN and MAC information of the interface of the layer-3 VLAN, and send the second TRILL data message to the layer-3 network manager through the ingress RB.

Figure 3:
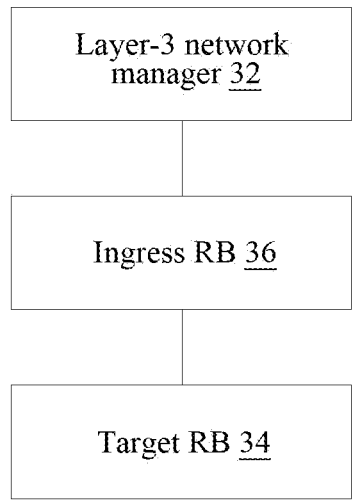
FIG. 3 is a structural diagram of a system for managing a TRILL network by a layer-3 network manager according to an embodiment of the present document.

The embodiment also provides a system for managing a TRILL network by a layer-3 network manager. FIG. 3 is a structure block diagram of a system for managing a TRILL network by a layer-3 network manager according to an embodiment of the present document. As shown in FIG. 3, the system includes: the layer-3 network manager 32, an ingress RB 36 and a target RB 34 in the TRILL network. The system will be described below in detail.

The layer-3 network manager 32 is arranged to send an Ethernet frame carrying a layer-3 Virtual Local Area Network (VLAN) and MAC information of its interface; the target RB 34 in the TRILL network is arranged to associate with the interface of the layer-3 Virtual Local Area Network (VLAN), publish the layer-3 VLAN as a participant VLAN of the target RB, and calculate and issue a broadcast decapsulation flag for the layer-3 VLAN, herein, the participant VLAN is used for all RBs in the TRILL network according to the participant VLAN to calculate and generate a unicast encapsulation table, a broadcast encapsulation table and a broadcast forwarding table for reaching the target RB; and the ingress RB 36 in the TRILL network is arranged to receive an Ethernet frame which is sent by the layer-3 network manager and carries the layer-3 VLAN and the MAC information of its interface, encapsulate the Ethernet frame into a first TRILL data message according to the unicast encapsulation table or the broadcast encapsulation table, and forward the first TRILL data message to the target RB according to an acquired unicast forwarding table or the broadcast forwarding table; and the target RB 34 is further arranged to receive the first TRILL data message forwarded according to the broadcast forwarding table and decapsulate the first TRILL data message to obtain the Ethernet frame according to the broadcast decapsulation flag, or receive the first TRILL data message forwarded according to the unicast forwarding table and decapsulate the first TRILL message to obtain the Ethernet frame.

Descriptions will be made below combined with alternative embodiments, and the following alternative embodiments combine the abovementioned embodiments and its alternative implementation modes.

A communication method for managing a TRILL network by a layer-3 network manager in the following alternative embodiment is communication in the TRILL network, each TRILL equipment Routing Bridge (RB) may currently process a layer-2 data message only, a started layer-3 interface is associated with a TRILL protocol on the RB, and the layer-3 interface having a specific management VLAN, thereby notifying that the Routing Bridge (RB) has a local specified forwarder participant VLAN in a TRILL-ISIS LSP message, moreover, a local unpacking flag is transmitted in a broadcast table of the VLAN, the TRILL protocol is connected, and all RBs in the TRILL network may generate required broadcast and unicast forwarding table entries of the VLAN to implement broadcast and unicast communication reaching the RB in the VLAN. In addition, after receiving a management TRILL data packet, after decapsulating a TRILL header by the RB, an ordinary Ethernet message is obtained, and may have an opportunity of querying a layer-3 forwarding table again, and when a message with a local IP address is found, the message is immediately reported to the RB, and the RB processes this data message. A purpose of managing the RB by virtue of the layer-3 network manager may finally be achieved.

A layer-3 management interface is started through the managed RB, and the interface has a planned unique management VLAN, and the layer-3 management interface is associated with the TRILL protocol through a command.

On the managed RB, after the interface of the management VLAN is associated with TRILL, a local decapsulation flag is generated in the broadcast forwarding table of the local RB, and after receiving a broadcast data packet of the VLAN, the RB decapsulates a TRILL broadcast data message; and on the managed RB, after the interface of the management VLAN is associated with TRILL, the management VLAN will be notified in a participant VLAN sub-TLV, generated by the local RB, in the TRILL-ISIS protocol. This causes that all the RBs in the TRILL network may generate the required broadcast and unicast forwarding table entries of the VLAN to implement broadcast and unicast communication reaching the RB in the VLAN; and on the managed RB, after receiving a broadcast and unicast TRILL message of the management VLAN, a local layer-3 forwarding table entry is queried according to a destination IP address of a decapsulated ordinary Ethernet message, and it is found that the destination IP address of the Ethernet message is an address of the interface on the RB, the Ethernet message is immediately reported, the RB processes the data message, and the RB is managed.

Network equipment running a TRILL protocol in the following alternative embodiment is applicable to various kinds of equipment supporting TRILL, including a switch, a computer host and the like.

Specifically, a communication method for managing a TRILL network by a layer-3 network manager in the alternative embodiment may manage an Routing Bridge (RB) by virtue of layer-3 network equipment.

The managed RB may start a layer-3 management interface, and the interface has a planned unique management VLAN. The layer-3 management interface is associated with a TRILL protocol through a command, but no operations of an ordinary TRILL enabled interface may be performed.

After the interface of the management VLAN is associated with TRILL, a local decapsulation flag may be generated in a broadcast forwarding table of the local RB, so that the RB may decapsulate a TRILL broadcast data message after receiving a broadcast data packet of the VLAN.

After the interface of the management VLAN is associated with TRILL, the management VLAN may be notified in a participant VLAN sub-TLV, generated by the local RB, in a TRILL-ISIS protocol. This causes that all RBs in the TRILL network may generate a required broadcast and unicast encapsulation table and broadcast and unicast forwarding table entries of the VLAN to implement broadcast and unicast communication reaching the RB in the VLAN.

On the managed RB, after a broadcast and unicast TRILL message of the management VLAN is received, a local layer-3 forwarding table is required to be queried again according to a destination IP address of a decapsulated ordinary Ethernet message, and if it is found that the destination IP address of the Ethernet message is an address of the interface on the RB, the Ethernet message is immediately reported, the RB processes the data message, and a purpose of managing the RB is achieved.

The alternative embodiments will be described below combined with specific implementation modes in detail.

Embodiment 1

A local processing method for an RB

Figure 4:
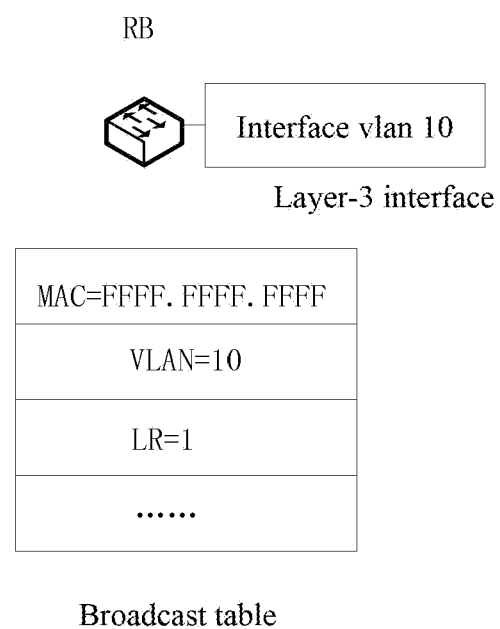
FIG. 4 is a schematic diagram of a managed RB according to an embodiment 1 of the present document.

FIG. 4 is a schematic diagram of a managed RB according to embodiment 1 of the present document. As shown in FIG. 4, the managed RB is required to start a layer-3 interface, the layer-3 interface is interface vlan10, and VLAN 10 is a specific planned management VLAN. In TRILL, interface vlan10 is associated with TRILL, but no operations of an ordinary TRILL enabled interface will be performed, for example: sending a TRIL-HELLO message and establishing a TRILL neighbor.

After the managed RB associates interface vlan10 with TRILL, the RB may generate own TRILL ISIS LSP message, a router capability TLV of the LSP includes an Interested VLANs and Spanning Tree Roots Sub-TLV, and vlan10 is notified as a participant VLAN 10 of the managed RB. In such a manner, all RBs in the TRILL network may generate required broadcast and unicast forwarding table entries of the VLAN to implement communication to broadcast and unicast networks reaching the RB in the VLAN, and of course, it is also a network communication manner of the TRILL network itself.

After associating interface vlan10 with TRILL, the managed RB may generate a broadcast table entry in the VLAN shown in FIG. 4 in a local broadcast table, carried with a local decapsulation flag LR=1. If a broadcast TRILL data message of VLAN=10 is received, decapsulation may be performed, a TRILL encapsulated header is removed, and an ordinary Ethernet frame is recovered. Of course, if a unicast TRILL data message with a TRILL header where a destination nickname is a nickname of the RB is received, decapsulation may also be performed, a TRILL encapsulated header is removed, and an ordinary Ethernet frame is recovered.

The ordinary Ethernet frame includes an IP data message, a local IP layer-3 forwarding table is queried on the RB to find that a destination IP address is an IP address of the local interface, i.e. interface vlan10, and then ordinary Ethernet frame is directly reported for the RB to process the data message.

Figure 5:
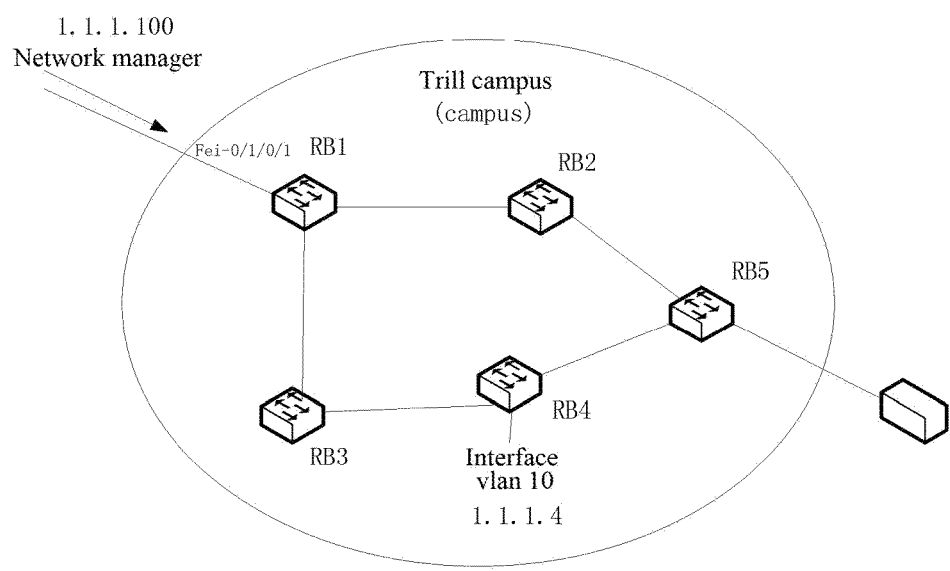
FIG. 5 is a schematic diagram of communication of a TRILL network managed by a layer-3 network manager according to an embodiment 1 of the present document.

FIG. 5 is a schematic diagram of communication of a TRILL network managed by a layer-3 network manager according to embodiment 1 of the present document. On the basis of FIG. 5, a communication process for the TRILL network managed by the layer-3 network manager is further described as follows.

1) Management Networking of the Network Manager

A TRILL campus network shown in FIG. 5 is managed by the layer-3 network manager, the network consists of RB1, RB2, RB3, RB4 and RB5, nicknames are nickname 1, nickname 2, nickname 3, nickname 4 and nickname 5 respectively, and in the figure, it is supposed that the layer-3 network manager has an IP address of 1.1.1.1, and enters the TRILL network through ingress RB1, a VLAN of an Ethernet frame is 10, RB4 is managed by VLAN 10, RB4 has a layer-3 interface vlan10, and a configured layer-3 IP address is 1.1.1.4.

2) A Solution for Managing the TRILL Network by the Network Manager

A data message of the network manager carries the Ethernet frame of which VLAN information is VLAN 10, and after the data message enters the TRILL network from a TRILL access interface, with an interface name of fei-0/1/0/1, of RB1, that is, the access interface fei-0/1/0/1, of TRILL must be required to be configure vlan10, with a specified forwarder of vlan10 responsible for ingress encapsulation and decapsulation of TRILL.

At first, after the Ethernet frame with a data message VLAN 10, of the network manager enters the TRILL campus network from RB1 fei-0/1/0/1, destination MAC of the Ethernet frame is a MAC address of the layer-3 interface, i.e. interface vlan10, of RB4, and is called RB4 network manager MAC, and a source MAC address is a MAC address of an equipment interface of the network manager, and is called network manager source MAC. At this moment, there is no nickname 4 of the RB4 network manager MAC on RB1, then broadcast in VLAN 10 is required, a broadcast encapsulation table of VLAN 10 is looked up, and a TRILL header is encapsulated: a destination nickname is a tree root nickname, a source nickname is nickname 1 of RB1, and an M flag bit is 1. Then, a broadcast table of VLAN 10 is looked up, and a message is sent to RB4. When the TRILL message reaches RB4, the broadcast table of VLAN 10 is looked up to find that it has a local receiving and unpacking flag of LR, then the TRILL header is removed, the Ethernet frame sent by the network manager is recovered, a layer-3 forwarding table is further queried, it is found to be a destination address of a directly connected IP address of own equipment, and a data packet is directly delivered to the interface, i.e. interface vlan10, for managing RB4. In addition, it is still necessary to keep an original TRILL flow for processing and querying a local MAC address forwarding table for forwarding of a local frame flow.

After the abovementioned broadcast, RB4 learns about that the nickname of the network manager source MAC address is 1, and RB4 encapsulates an IP Ethernet frame: a destination MAC address is the network manager source MAC, a source MAC address is an interface MAC address of interface vlan10, and a VLAN is 10. Then, the nickname of distal RB1 corresponding to MAC+VLAN10 (the network manager source MAC address) learned by RB4 is searched, a TRILL message is encapsulated: a destination nickname is 1, a source nickname is 4, the TRILL message is sent to RB1 in a unicast manner, and after receiving and decapsulating the data message, RB1 looks up a local MAC forwarding table, and the data message reaches the network manager after being output from the TRILL network through fei-0/1/0/1.

Thereafter, a data packet, entering from RB1, of a network manager source may also be unicast to RB4, and is unicast to RB1 to the network manager by RB4 to achieve a purpose of managing RB4 by the network manager.

In another embodiment, software is also provided, and the software is configured to execute the technical solutions described in the abovementioned embodiment and alternative embodiments.

In another embodiment, a storage medium is also provided, the abovementioned software is stored in the storage medium, and the storage medium includes, but not limited to, a compact disc, a floppy disk, a hard disk, an erasable memory and the like.

Obviously, those skilled in the art should know that each module or each step of the abovementioned present document may be implemented by a universal computing device, and they may be concentrated on a single computing device or distributed on a network formed by a plurality of computing devices, and alternatively, they may be implemented by program codes executable for the computing devices, so that they may be stored in a storage device for execution with the computing devices, and in some circumstances, the shown or described steps may be executed in sequences different from those described here, or they may form each integrated circuit module respectively, or multiple modules or steps therein form a single integrated circuit module for implementation. As a consequence, the present document is not limited to any specific hardware and software combination.

The above are only the alternative embodiments of the present document and not intended to limit the present document, and for those skilled in the art, the present document may have various modifications and variations. Any modifications, equivalent replacements, improvements and the like within the spirit and principle of the present document shall fall within the scope of protection of the present document.

INDUSTRIAL APPLICABILITY

As mentioned above, the method, device and system for managing the TRILL network by the layer-3 network manager provided by the embodiment of the present document have the following beneficial effects: the problem of incapability in managing an RB running TRILL by virtue of the layer-3 network manager in the related technology is solved, and the TRILL network is conveniently planned and configured.

What is claimed is:

1. A method for managing a Transparent Interconnection of Lots of Links (TRILL) network by a layer-3 network manager, comprising:

associating a target Routing Bridge (RB) in the TRILL network with an interface of a layer-3 Virtual Local Area Network (VLAN); notifying, by the target RB, the layer-3 VLAN as a participant VLAN of the target RB, and calculating and issuing a broadcast decapsulation flag for the layer-3 VLAN, wherein the participant VLAN is used for all RBs in the TRILL network according to the participant VLAN calculating and generating a unicast encapsulation table, a broadcast encapsulation table and a broadcast forwarding table for reaching the target RB; wherein the broadcast encapsulation table is configured to encapsulate a layer-2 Ethernet frame into a TRILL broadcast data message; the unicast encapsulation table is arranged to encapsulate a layer-2 Ethernet frame into a TRILL unicast data message; the broadcast forwarding table is configured to forward a TRILL broadcast data message; the unicast forwarding table is arranged to forward a TRILL unicast data message;

receiving, by an ingress RB in the TRILL network, an Ethernet frame which is sent by the layer-3 network manager and carries the layer-3 VLAN and Media Access Control (MAC) information of the interface of the layer-3 VLAN; encapsulating, by the ingress RB, the Ethernet frame into a first TRILL data message according to the unicast encapsulation table or the broadcast encapsulation table, and forwarding the first TRILL data message to the target RB according to an acquired unicast forwarding table or the broadcast forwarding table;

receiving, by the target RB, the first TRILL data message forwarded according to the broadcast forwarding table, determining, by the target RB, that the received first TRILL data message is a broadcast data message and the first TRILL data message is received from a VLAN having the broadcast decapsulation flag of the target RB, and decapsulating the first TRILL data message to obtain the Ethernet frame according to the broadcast decapsulation flag; or, receiving, by the target RB, the first TRILL data message forwarded according to the unicast forwarding table, and decapsulating the first TRILL message to obtain the Ethernet frame.

2. The method according to claim 1, wherein, after decapsulating, by the target RB, the first TRILL data message to obtain the Ethernet frame, the method further comprises:

judging, by the target RB, whether a destination Internet Protocol IP address contained in the Ethernet frame is an IP address of the interface of the layer-3 VLAN or not according to a layer-3 forwarding table of the target RB; and if the destination IP address contained in the Ethernet frame is the IP address of the interface of the layer-3 VLAN, sending, by the target RB, the Ethernet frame to the interface of the layer-3 VLAN and processing the Ethernet frame.

3. The method according to claim 2, wherein, notifying, by the target RB, the layer-3 VLAN as the participant VLAN of the target RB comprises:

comprising, by the target RB, an Interested VLANs and Spanning Tree Roots Sub-Threshold Limit Value, in a router capability Threshold Limit Value (TLV) of a generated Link State Packet (LSP) message.

4. The method according to claim 2, wherein, after associating the target RB in the TRILL network with the interface of the layer-3 VLAN, the method further comprises:

not performing an enabled interface operation of the TRILL network on the interface of the layer-3 VLAN.

5. The method according to claim 1, wherein, after receiving, by the target RB, the first TRILL data message forwarded according to the broadcast forwarding table according to the broadcast decapsulation flag, and decapsulating the first TRILL data message to obtain the Ethernet frame, the method further comprises:

acquiring, by the target RB, VLAN and MAC information of the layer-3 network manager carried in the first TRILL data message, and adding the VLAN and MAC information of the layer-3 network manager into a TRILL MAC table of the target RB.

6. The method according to claim 5, wherein, notifying, by the target RB, the layer-3 VLAN as the participant VLAN of the target RB comprises:

comprising, by the target RB, an Interested VLANs and Spanning Tree Roots Sub-Threshold Limit Value, in a router capability Threshold Limit Value (TLV) of a generated Link State Packet (LSP) message.

7. The method according to claim 5, wherein, after associating the target RB in the TRILL network with the interface of the layer-3 VLAN, the method further comprises:

not performing an enabled interface operation of the TRILL network on the interface of the layer-3 VLAN.

8. The method according to claim 1, wherein, after decapsulating, by the target RB, the first TRILL data message to obtain the Ethernet frame, the method further comprises:

encapsulating, by the target RB, a response message of the Ethernet frame into a second TRILL data message, wherein source MAC information carried in the second TRILL data message is VLAN and MAC information of the interface of the layer-3 VLAN, and sending the second TRILL data message to the layer-3 network manager through the ingress RB.

9. The method according to claim 8, wherein, forwarding, by the ingress RB in the TRILL network, the first TRILL data message to the target RB according to the acquired unicast forwarding table comprises:

acquiring, by the ingress RB, the second TRILL data message from the target RB, wherein the second TRILL data message carries the VLAN and MAC information of the interface of the layer-3 VLAN, and adding the VLAN and the MAC information into a TRILL MAC table of the ingress RB; and acquiring, by the ingress RB, the MAC information of the interface of the layer-3 VLAN in the received Ethernet frame, and forwarding through the unicast forwarding table the first TRILL data message to the target RB according to the MAC information of the interface of the layer-3 VLAN in the Ethernet frame.

10. The method according to claim 8, wherein, notifying, by the target RB, the layer-3 VLAN as the participant VLAN of the target RB comprises:

comprising, by the target RB, an Interested VLANs and Spanning Tree Roots Sub-Threshold Limit Value, in a router capability Threshold Limit Value (TLV) of a generated Link State Packet (LSP) message.

11. The method according to claim 8, wherein, after associating the target RB in the TRILL network with the interface of the layer-3 VLAN, the method further comprises:

not performing an enabled interface operation of the TRILL network on the interface of the layer-3 VLAN.

12. The method according to claim 1, wherein, notifying, by the target RB, the layer-3 VLAN as the participant VLAN of the target RB comprises:

comprising, by the target RB, an Interested VLANs and Spanning Tree Roots Sub-Threshold Limit Value, in a router capability Threshold Limit Value (TLV) of a generated Link State Packet (LSP) message.

13. The method according to claim 1, wherein, after associating the target RB in the TRILL network with the interface of the layer-3 VLAN, the method further comprises:

not performing an enabled interface operation of the TRILL network on the interface of the layer-3 VLAN.

14. An apparatus for managing a Transparent Interconnection of Lots of Links (TRILL) network by a layer-3 network manager, located in a target Running Bridge (RB) in the TRILL network, and comprising a first processor and a first storage device, wherein the first storage device stores first processor-executable programs, and the first processor-executable programs comprise:

an association module, arranged to associate with an interface of a layer-3 Virtual Local Area Network (VLAN); notify the layer-3 VLAN as a participant VLAN of the target RB, and calculate and issue a broadcast decapsulation flag for the layer-3 VLAN, wherein the participant VLAN is used for all RBs in the TRILL network according to the participant VLAN calculating and generating a unicast encapsulation table, a broadcast encapsulation table and a broadcast forwarding table for reaching the target RB; wherein the broadcast encapsulation table is configured to encapsulate a layer-2 Ethernet frame into a TRILL broadcast data message; the unicast encapsulation table is arranged to encapsulate a layer-2 Ethernet frame into a TRILL unicast data message; the broadcast forwarding table is configured to forward a TRILL broadcast data message; the unicast forwarding table is arranged to forward a TRILL unicast data message;

a decapsulation module, arranged to receive a first TRILL data message forwarded by an ingress RB in the TRILL network according to the broadcast forwarding table and decapsulate the first TRILL data message to obtain an Ethernet frame according to the broadcast decapsulation flag; or, receive the first TRILL data message forwarded by the ingress RB in the TRILL network according to a unicast forwarding table and decapsulate the first TRILL message to obtain the Ethernet frame; wherein, the ingress RB receives the Ethernet frame which is sent by the layer-3 network manager and carries the layer-3 VLAN and Media Access Control (MAC) information of the interface of the layer-3 VLAN, and the ingress RB encapsulates the Ethernet frame into the first TRILL data message according to the unicast encapsulation table or the broadcast encapsulation table, and forwards the first TRILL data message to the target RB according to the acquired unicast forwarding table or the broadcast forwarding table, wherein, the decapsulation module comprises a second processor and a second storage device, wherein the second storage device stores second processor-executable programs, and the second processor-executable programs comprise:

a determination unit, arranged to determine that the received first TRILL data message is a broadcast data message and the first TRILL data message is received from a VLAN having the broadcast decapsulation flag of the target RB, and then decapsulate the first TRILL data message to obtain the Ethernet frame.

15. The apparatus according to claim 14, wherein, the first processor-executable programs further comprise:

a judgment module, arranged to judge whether a destination IP address contained in the Ethernet frame is an IP address of the layer-3 interface or not according to a layer-3 forwarding table of the target RB; and a processing module, arranged to, in a condition that a judgment result is yes, send the Ethernet frame to the interface of the layer-3 VLAN and process the Ethernet frame.

16. The apparatus according to claim 14, wherein, the first processor-executable programs further comprise:

an addition module, arranged to acquire VLAN and MAC information of the layer-3 network manager carried in the first TRILL data message, and add the VLAN and MAC information of the layer-3 network manager into a TRILL MAC table of the target RB.

17. The apparatus according to claim 14, wherein, the first processor-executable programs further comprise:

an encapsulation module, arranged to encapsulate a response message of the Ethernet frame into a second TRILL data message, wherein source MAC information carried in the second TRILL data message is VLAN and MAC information of the interface of the layer-3 VLAN, and send the second TRILL data message to the layer-3 network manager through the ingress RB.

18. A system for managing a Transparent Interconnection of Lots of Links (TRILL) network by a layer-3 network manager, comprising:

the layer-3 network manager, arranged to send an Ethernet frame carrying a layer-3 Virtual Local Area Network (VLAN) and Media Access Control (MAC) information of an interface of the layer-3 VLAN;

a target Routing Bridge (RB) in the TRILL network, arranged to associate with the interface of the layer-3 VLAN; notify the layer-3 VLAN as a participant VLAN of the target RB, and calculate and issue a broadcast decapsulation flag for the layer-3 VLAN, wherein the participant VLAN is used for all RBs in the TRILL network according to the participant VLAN calculating and generating a unicast encapsulation table, a broadcast encapsulation table and a broadcast forwarding table for reaching the target RB; wherein the broadcast encapsulation table is configured to encapsulate a layer-2 Ethernet frame into a TRILL broadcast data message; the unicast encapsulation table is arranged to encapsulate a layer-2 Ethernet frame into a TRILL unicast data message; the broadcast forwarding table is configured to forward a TRILL broadcast data message; the unicast forwarding table is arranged to forward a TRILL unicast data message;

an ingress RB in the TRILL network, arranged to receive an Ethernet frame which is sent by the layer-3 network manager and carries the layer-3 VLAN and MAC information of the interface of the layer-3 VLAN, encapsulate the Ethernet frame into a first TRILL data message according to the unicast encapsulation table or the broadcast encapsulation table, and forward the first TRILL data message to the target RB according to an acquired unicast forwarding table or the broadcast forwarding table;

the target RB is further arranged to receive the first TRILL data message forwarded according to the broadcast forwarding table, determine that the first TRILL data message which is received is a broadcast data message and the first TRILL data message is received from a VLAN having the broadcast decapsulation flag of the target RB, and decapsulate the first TRILL data message to obtain the Ethernet frame according to the broadcast decapsulation flag; or, receive the first TRILL data message forwarded according to the unicast forwarding table, and decapsulate the first TRILL message to obtain the Ethernet frame.

* * * * *